M. BEMISS.
Seed-Planter.
No. 15,322.  Patented July 15, 1856.
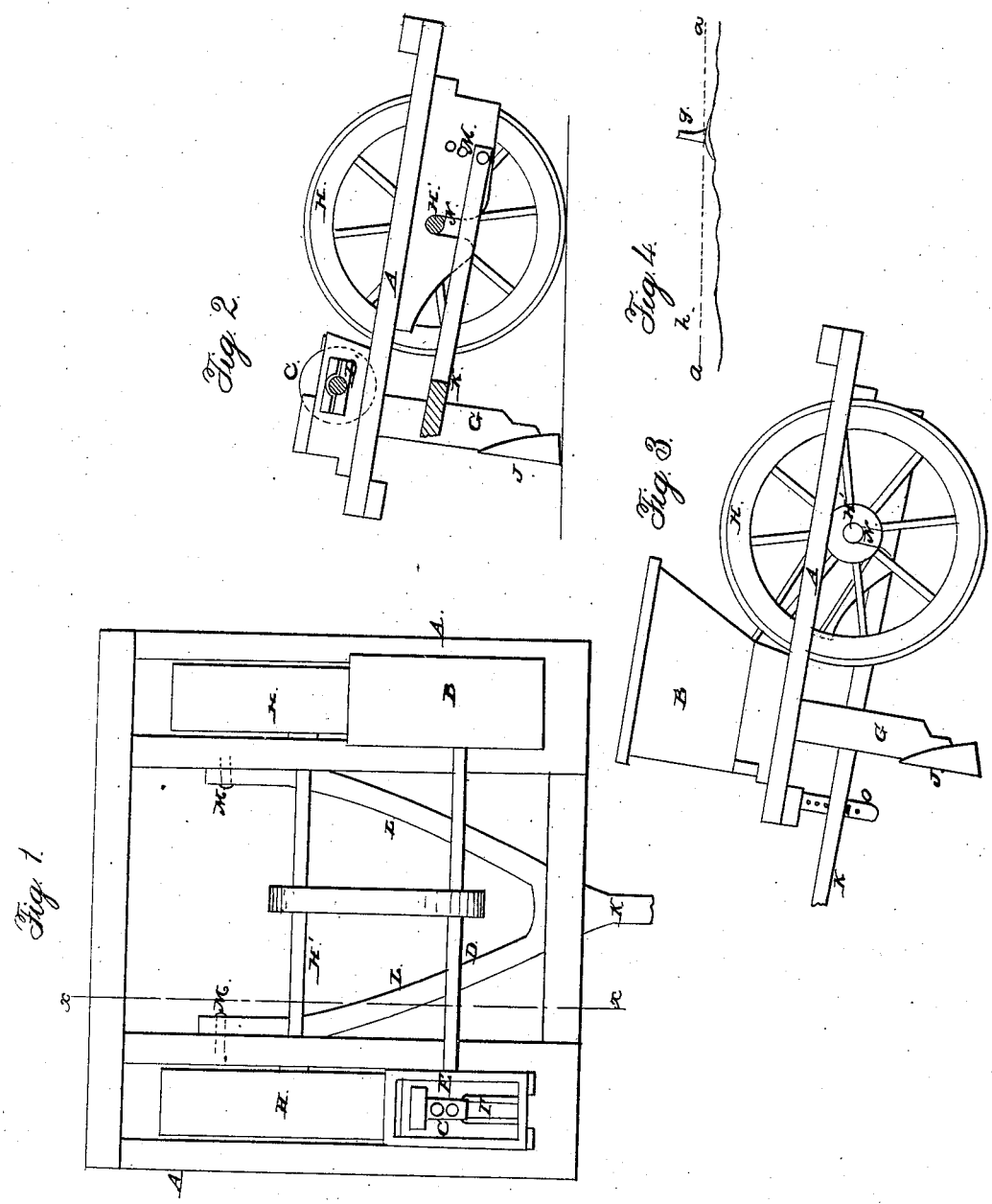

UNITED STATES PATENT OFFICE.

MOSES BEMISS, OF LYME, OHIO.

IMPROVEMENT IN CORN-PLANTERS.

Specification forming part of Letters Patent No. 15,322, dated July 15, 1856.

*To all whom it may concern:*

Be it known that I, M. BEMISS, of Lyme, in the county of Huron and State of Ohio, have invented a new and useful Improvement in Corn-Planters; and I do hereby declare that the following is a full and exact description of the same, reference being had to the accompanying drawings, in which—

Figure 1 is a plan view, and Fig. 2 a longitudinal section in the direction of the line $x\,x$, Fig. 1. Fig. 3 is a side elevation, and Fig. 4 will be referred to in description.

Like letters designate like parts in the several figures.

To the frame A of the machine is connected two hoppers or seed-boxes, B B. At the bottom of each hopper or box is a roller corresponding to C, Figs. 1 and 2. These two rollers are secured on the shaft D, the bearings being on each side of the roller. In the rollers are cups, as seen at E, Fig. 1. In front of the rollers is placed a spring, (shown at F,) the end of which is slightly curved or turned, so as to prevent injury to the grain, and fits close to the cylinder. The seed from the box passes into the cups of the rollers as they revolve, and by the action of the spring F the grain is so gaged that only the desired quantity is allowed to pass from the box.

The grain is conveyed from the box to the spout G, through which it passes to the ground, the seed being covered up by the driving-wheels H H. These driving-wheels are secured to the shaft H', on which is keyed a pulley and belts onto the shaft D. By this means the rollers are operated so that the seed is conveyed from the hopper to the ground. One of the hoppers is removed, Figs. 1 and 2.

The front lower end of the spout is protected by the plate J, which is of such form as to prevent the lodgment of roots, grass, &c.

The tongue or shaft K is forked, so as to form two arms at the back end, as shown at L L, Fig. 1. These arms are connected to the frame at M M by a pin-joint, which is back of the axle and below the center of the shaft H', which is the driving-shaft, as seen in Fig. 2.

The shaft H' is not connected to the machine by a stationary box, but is so disconnected that the vertical movements of the machine adapt it to the ground independently of the wheels and axle.

The bearing of the shaft is of an oblong form, as shown at N, Figs. 2 and 3. This allows the machine to adapt itself to the nature of the ground without being at all times subject to the motion of the wheels by the roughness of the ground.

If the wheels and shaft were connected to the frame by stationary boxes, the wheel $h$, Fig. 4, would be raised from the ground to a level with the lower end of the tube $g$, by the unevenness of the ground, as indicated by the line $a\,a$. This would bring the weight of half the frame and one wheel upon the spout G and would press it too deep into the ground.

By allowing the wheel and shaft to drop, and by attaching the draft below and behind the axle, when the spout G meets an obstruction or unusual resistance the increased draft has a direct tendency to raise the tube G up over the uneven surface by the action of the draft being transmitted to the point M, forming the connection of the arms of the pole with the frame. By carrying the line of draft or point of connection M lower down a leverage could be obtained that would overcome the weight or down-pressure forward.

There would be less necessity for detaching the frame from the axle were the ground always level; but as it is not uniform, and, as a general thing, imperfectly plowed and often planted with harrowing, it becomes necessary to so construct machines of this kind that they will adjust themselves to the roughness of the surface.

By the dropping down of the wheels the seed is always covered up by them as they pass over, which would not be the case if the axle were connected to the frame by a box fast to the frame.

From the under side of the front of the machine projects the arm O, Fig. 3, which is provided with holes, and to which is fitted a spring key or pin. This arm passes through a slot in the tongue K.

The action of the arm O and pin is to control the upward and downward motion of the machine produced by the draft and by the unevenness of the ground. It also prevents the machine from swaying laterally.

What distinguishes my invention from others is the method of detaching the frame from the axle and wheels to facilitate the operation of the machine in passing over inequalities of the ground, and also connecting the point of draft behind and below the axle for the purpose of counteracting the downward pressure forward and to facilitate in regulating and governing the depth of planting by raising and lowering the frame by means of the arm O and pins as connected with the tongue.

What I claim as my improvement, and for which I desire to secure Letters Patent, is—

Arranging the frame upon the axle and wheels and connecting the point of draft behind and below the axle, and in combination with the arm O and pins, in the manner substantially as described, and for the purpose set forth.

MOSES BEMISS.

Witnesses:
   RUFUS B. RUSSELL,
   ALFRED STEBBINS.